United States Patent
Reinhold

(10) Patent No.: US 10,057,065 B2
(45) Date of Patent: Aug. 21, 2018

(54) SYSTEM AND METHOD FOR SECURELY STORING AND UTILIZING PASSWORD VALIDATION DATA

(71) Applicant: Arnold G. Reinhold, Cambridge, MA (US)

(72) Inventor: Arnold G. Reinhold, Cambridge, MA (US)

( * ) Notice: Subject to any disclaimer, the term of this patent is extended or adjusted under 35 U.S.C. 154(b) by 0 days.

(21) Appl. No.: 15/496,082

(22) Filed: Apr. 25, 2017

(65) Prior Publication Data

US 2017/0317828 A1    Nov. 2, 2017

Related U.S. Application Data

(60) Provisional application No. 62/328,948, filed on Apr. 28, 2016.

(51) Int. Cl.
| | | |
|---|---|---|
| *H04L 9/32* | (2006.01) | |
| *H04L 9/06* | (2006.01) | |
| *H04L 29/06* | (2006.01) | |

(52) U.S. Cl.
CPC .......... *H04L 9/3226* (2013.01); *H04L 9/0643* (2013.01); *H04L 9/3239* (2013.01); *H04L 9/3242* (2013.01); *H04L 63/06* (2013.01)

(58) Field of Classification Search
CPC .......... H04L 9/32; H04L 9/0643; H04L 63/06
See application file for complete search history.

(56) References Cited

U.S. PATENT DOCUMENTS

| | | | |
|---|---|---|---|
| 1,310,719 A | 7/1919 | Vernam | |
| 6,583,712 B1 * | 6/2003 | Reed | G07C 9/00103 340/5.21 |
| 7,746,224 B2 * | 6/2010 | Addy | G06Q 10/107 340/506 |
| 7,843,322 B2 * | 11/2010 | Zakrewski | G06Q 10/107 340/506 |
| 9,021,269 B2 | 4/2015 | Spilman | |
| 9,509,802 B1 * | 11/2016 | Stalling | H04L 67/42 |
| 2003/0202661 A1 * | 10/2003 | Rodriguez | H04N 7/1675 380/239 |
| 2008/0086780 A1 * | 4/2008 | Chen | G06F 21/572 726/27 |

(Continued)

OTHER PUBLICATIONS

Morris, R. and Thompson, K., "Password Security: A Case History", Bell Laboratories, 6 pages (1978); downloaded from URL: https://www.bell-labs.com/usr/dmr/www/passwd.ps.

(Continued)

*Primary Examiner* — Saleh Najjar
*Assistant Examiner* — Louis C Teng
(74) *Attorney, Agent, or Firm* — Chapin IP Law, LLC

(57) ABSTRACT

A system and method for storing and accessing password verification data on multi-user computer systems that prevents remote attacks. Along with commonly-employed measures that limit the number of unsuccessful attempts to login or otherwise verify a password, it allows users to choose relatively simple passwords with full security. The secret component cannot be easily leaked or exfiltrated does not require periodic backup and is isolated in a way that allows it to be protected by conventional security measures such as safes, alarm systems and video surveillance from attackers who somehow gain access to the computing facility.

22 Claims, 7 Drawing Sheets

(56) References Cited

U.S. PATENT DOCUMENTS

| | | | | |
|---|---|---|---|---|
| 2008/0133679 | A1* | 6/2008 | Addy | G06Q 10/06 709/206 |
| 2010/0030856 | A1* | 2/2010 | Blum | G06Q 10/06 709/206 |
| 2014/0022849 | A1* | 1/2014 | Krutzik | G06F 21/80 365/185.33 |
| 2014/0215613 | A1* | 7/2014 | Kelley | G06F 21/86 726/23 |
| 2014/0240915 | A1* | 8/2014 | Phelan | G11B 33/128 361/679.31 |
| 2016/0044034 | A1* | 2/2016 | Spilman | G06F 21/602 713/181 |
| 2016/0132415 | A1* | 5/2016 | Dillard | G06F 11/263 714/33 |
| 2016/0155163 | A1* | 6/2016 | White | G06Q 30/0605 705/26.2 |
| 2017/0193787 | A1* | 7/2017 | Devdas | G08B 21/043 |
| 2017/0330290 | A1* | 11/2017 | Schuh | G06Q 40/123 |
| 2018/0004930 | A1* | 1/2018 | Csinger | G06F 21/40 |

OTHER PUBLICATIONS

Reinhold, A., "HEKS: A Family of Key Stretching Algorithms", 11 pages, (1999); downloaded from URL: http://world.std.com/~reinhold/HEKSproposal.html.

Percival, C., "Stronger Key Derivation Via Sequential Memory-Hard Functions", 16 pages, no date given; downloaded from URL: https://www.tarsnap.com/scrypt/scrypt.pdf.

Chen, C., "Zeusminer Delivers Lightning, Thunder, and Cyclone Scrypt ASICs for Litecoin and Dogecoin Mining", CryptoCoins News, 3 pages, May 21, 2014; downloaded from URL: http://www.cryptocoinsnews.com/news/zeusminer-delivers-lightning-thunder-cyclone-scrypt-asics-litecoin-dogecoin-mining.

No Author Given, "Blind Hashing Technology Overview", 2 pages, No Date Provided; downloaded on Apr. 20, 2017 from URL: https://taplink.co/technology/.

Boak, D. G., "A History of U.S. Communications Security (vols. I and II); the David G. Boak Lectures," National Security Agency (NSA), revised Jul. 1973, declassified in 2008 and 2015, p. 39; downloaded from URL: http://www.governmentattic.org/18docs/Hist_US_COMSEC_Boak_NSA_1973u.pdf.

No Author Given, "How does Rubberhose work?", 2 pages, archived by archive.org on Nov. 24, 2004; downloaded from URL: https://web.archive.org/web/20041124173754/http://iq.org:80/~proff/rubberhose.org/current/src/doc/maruguide/x32.html.

Schneier, B., "Schneier on Security, Deniable File System", 28 pages, Apr. 2006; downloaded from URL: https://www.schneier.com/blog/archives/2006/04/deniable_file_s.html.

Reinhold, A., "One-Time Pad: Difference Between Revisions", Wikipedia, 12 pages, Apr. 1, 2005; downloaded from URL: httpps://en.wikipedia.org/w/index.php?title=One-time_pad&type=revisions&diff=11771171&oldid=11763901.

No Author Given, "Rubberhose", 2 pages, No Date Given; downloaded on May 23, 2017 from URL: https://web.archive.org/web/20031206045542/http://www.iq.org:80/~proff/rubberhose.org/.

* cited by examiner

SYSTEM AND METHOD FOR SECURELY STORING AND UTILIZING PASSWORD VALIDATION DATA

RELATED APPLICATIONS

This application claims the benefit of U.S. Provisional Application No. 62/328,948 filed Apr. 28, 2016, entitled A Method for Securely Storing and Utilizing Password Validation Data, which application is hereby incorporated herein by reference in its entirety.

FIELD OF THE INVENTION

The present invention relates to computer security and more specifically to password authentication and protection of passwords.

BACKGROUND OF THE INVENTION

Passwords are strings of characters that computer users enter into computer systems to authenticate themselves and gain access to resources. The computer system then checks the password entered against validation data created and stored when the user created an account or, later, whenever the user changes their password. Passwords are perhaps the most common method to authenticate users of computer systems. While "the end of passwords" has been predicted by industry pundits, the complexity and expense of other approaches has kept passwords in wide use. But password-based authentication systems have been a factor in numerous security breaches and there exists a password arms race between hackers and implementers of secure computer systems. To understand why, one must understand the various methods that have been developed for implementing password systems.

The easiest way to implement password access control on an individual user basis is to create a database with a record for each user including, among other data, the user's password as plaintext. The stored password is then compared to the password supplied whenever someone attempts to log in claiming to be that user. Attempts to guess the password can be limited by disconnecting or timing out the login session after a few failed attempts. While simple to implement, this scheme presents a serious security risk: if an attacker somehow obtains a copy of the user database including the password records, they can impersonate any user. Worse, since users often use the same or similar passwords on multiple systems, compromising a user's passwords on one system can lead to compromises on several others.

A more secure approach is to apply a cryptographic hash function to the password and store the resulting hash value in the user's database record instead of the plain text password. The file /etc/passwd in early Unix systems is an example of this approach. This approach provides greater security, but still has vulnerabilities. Cryptographic hash functions, such as MD5, SHA1, SHA2, and SHA3, are designed to be very difficult to invert, but fast to compute. So while an attacker cannot directly compute the password from the stored hash (the inverse operation), they can build a table of commonly used passwords and their corresponding hash values. After gaining access to the hashed password the attacker can simply look up the hash value in the table and recover the password. Very efficient methods, such as Rainbow Tables, have been developed to store large sets of pre-computed hash values. Such tables are available on the Internet for common password hashes, including LM hash, NTLM, MD5, and SHA1.

The pre-computed table attack can be defeated using a technique known as "salt." Instead of hashing just the password, a salted system hashes the password along with another bit string, called the salt. This bit string is typically a random number generated at account creation and stored in the user's record along with the password. NIST recommends salt be at least 64 bits in length. Salt does not add secrecy to the password hash, since the salt value is stored in the same database record with the hash, but it breaks up the pre-computed attack because a separate table of pre-computed hashes is used for each salt value. The concept of salt was introduced with the crypt function in early Unix systems. (Password Security: A Case History, Robert Morris, Ken Thompson, Bell Laboratories, 1978.

Salted hashes are still vulnerable, however. An attacker who gains access to the password record can try many password guesses using the included salt value and test if they produce the stored hash value. Since common cryptographic hashes are designed to be fast, millions of guesses can be tested each second on modern CPUs. Worse, these hash algorithms are simple enough to be executed in parallel on the graphics processors included in many modern computers, allowing billions of guesses per second to be tested.

One defense is to use operating system access permissions to restrict access to the password database. Later Unix systems, for example, moved the password hash from /etc/passwd, which was globally readable, to /etc/shadow which was access protected. However the track record of such access protections is poor. Vulnerabilities in common operating systems allow privilege escalation, which can defeat access controls. Another defense is to encrypt the password file. But the corresponding decryption key must be present in the computer memory, and therefore subject to theft, perhaps by malware or a user who manages to gain higher access privileges. This can happen whenever the password file is in use, which is typically always.

Employing hash functions designed to consume significant computer resources can slow the rate of guessing. The simplest approach is to invoke a standard cryptographic function repeated many times. The Unix crypt function introduced this concept as well. A more modern example is PBKDF2 (Password-Based Key Derivation Function 2) developed by RSA Laboratories as PKCS #5 v2.0, also published as Internet Engineering Task Force's RFC 2898.

Algorithms like PBKDF2 can be implemented in custom integrated circuits (ASICs) using relatively few transistor gates, allowing very fast and relatively inexpensive password guessing. This approach has come to dominate mining of Bitcoin, which is based on principles very similar to PBKDF2. One way to mitigate this attack is to develop key derivation functions that in addition to requiring large computing resources also require large amounts of computer memory, thereby making custom ICs more expensive per guessed password. A software package called scrypt that has been used in several applications, including digital currencies Litecoin and Dogecoin. However ASICs for scrypt have since become available. (Zeusminer Delivers Lightning, Thunder, and Cyclone Scrypt ASICs For Litecoin And Dogecoin Mining, Caleb Chen, 2014 May 21.

In 2013, a Password Hashing Competition (PHC) was held to develop an even more resistant approach. On Jul. 20, 2015, the algorithm named Argon2 was selected as the final PHC winner, with special recognition given to four other password hashing schemes: Catena, Lyra2, yescrypt and Makwa. All these algorithms require substantial computing resources and memory by design. This approach is suitable for some applications, such as disk encryption, where a computer can be tied up for a half-second or more while the key to unlock the disk is derived.

However, using password hashes that require large amounts of computer resources can impose a significant burden on computing systems with large numbers of users. Meanwhile underworld attackers have gained access to vast computing resources through so-called botnets composed of thousands of computers that they have compromised. State actors, such as government signals intelligence organizations, can afford large server farms and huge arrays of custom integrated circuits. The best defense for users in the face of these threats is to choose long, complicated passwords or passphrases. Instructions for creating more secure passwords can be found on the Internet (e.g. the Diceware.com web site). However few uses take such precautions and once attackers gain access to a password validations database, they are usually able to recover, in plaintext form, a large fraction of the passwords.

Other conventional techniques for improving password management, and some of their limitations, include:

Password policy;
Password policy operates by encouraging or forcing users to employ stronger passwords. Often self-defeating, because users develop strategies to "get around" policy or keep passwords written down in places where they can be discovered.

Using a traditional keyed hash, such as an HMAC;
These add a small secret value to the password hashing. This secret has high value to an attacker and because it is short, it can be leaked via a software exploit, side channel attack, or stealthily purloined by an insider, any of which can destroy security.

Employing a segregated password verification server;
One alternative would be to store the password database in a segregated server, with physical protections similar to what we suggest for the restricted secret server. There are several problems with this approach. First, it would require a backup procedure for the password database separate from the normal enterprise backup system, with the backup media segregated for full security. Also, multiple password servers would typically be required for availability and reliability and they would need to have their databases synchronized, adding complexity and transmitting password data over communication channels, both of which increase security risks. The synchronization problem is more acute when organizations maintain multiple data centers and/or off site disaster recovery facilities, as the synchronization data must be transmitted over long distances while maintaining security.

Using a long list of secret salt values, assigned one at a time;
Another approach is using a long list of secret salt values, assigned one at a time as passwords are created or changed. These might be stored using security principles similar to what is suggested for the present invention. But a partial leak of the list would compromise at least some of the passwords protected by it.

Two factor authentication;
The most common suggested augmentation for password security is two-factor authentication, often using security fobs or specialized two-factor cell phone apps. These solutions are expensive to deploy and awkward for users. While their use can be mandated for employees, it is much harder to get consumers and other casual users to adopt these measures, particularly when they have many password protected accounts in their lives. Also without a secure way of handling password validation information (making the first factor insecure), two-factor authentication becomes, in effect, one factor authentication.

Certificate based authentication;
This approach uses public key cryptographic certificates and algorithms to authenticate users, but it has many of the same issues as two factor authentication.

Password manager applications;
These applications can automatically generate and store long passwords, which improve security, but the applications can be clumsy for users and present a potential target for attack and are particularly vulnerable when users employ a master password that is too short. Most people don't bother to use long passwords, even for a master password.

Blind Hashing;
Blind Hashing (BH) is described in U.S. Pat. No. 9,021,269. It was developed by TapLink, Inc. As disclosed in U.S. Pat. No. 9,021,269. Blind Hashing in operation uses a large pool of random or pseudorandom data stored in remote data centers. An enterprise using BH first creates a salted hash of a password and then transmits the salted hash to a remote site where a second salt is computed and sent back to the enterprise, which then uses the second salt to compute a second password hash. By contrast, the present invention, in one embodiment, only uses the salt to compute a password authenticator token and need not use the password at all at that stage of the process. It is essential for BH to incorporate the password in creating its index to the large random data stored in its data centers, since otherwise an attacker who compromises both the password data base and the communication link between the enterprise and the data center, perhaps by a man-in-the-middle attack, could just send the first salt, which is stored in the user record, to TapLink and recover the second salt. The second salt and the hash stored in the user record are sufficient to allow password guessing attacks with the same methods currently used successfully against conventional salted passwords. It is further worth observing that the security of remote communications over the Internet is difficult to guarantee. Such communications typically pass through many nodes, often in different countries. Compromises can be due to bugs in software at the enterprise or data center ends of the communication, defects in communication protocol standards, advances in cryptoanalysis, disloyal or blackmailed employees, or demands by state actors for the insertion of back doors to allow access, which in turn may be compromised by criminals. Note that by forming what is essentially a conventional salted password hash as the first step in its process, BH creates and transmits a data element, its first hash, that, if intercepted, is itself subject to the same attacks as conventional salted password hashes.

The concept of using a large collection of random bits to cryptographically protect data goes back to the one-time tape system developed by Gilbert Vernam and his colleagues. His U.S. Pat. No. 1,310,719, issued Jul. 22, 1919, disclosed the exclusive-or (XOR) method for combining data and cipherstream bits, used in connection with teleprinter operation, in particular, where key stream is supplied by punched paper tape. The U.S. used large quantities of one-time tape "from World War II until about 1960." Over a million and a half 8-inch reels of one-time paper tape were produced in 1952, for example, each with 100,000 random Baudot (5-bit) characters (ibid, p. 42), comprising about a terabit of random data.

The use of a large mass storage device filled with random data was explained in the "Rubber Hose" file system, originally released in 1997 by J. Assange, S. Dreyfus, and R. Weinmann. According to "How does Rubberhose work?", archived by archive.org on 24 Nov. 2004, https://web.archive.org/web/20041124173754/http://iq.org:80/~proff/rubberhose.org/current/src/doc/maruguide/x32.html, "when you run Rubberhose over a disk for the first time, the program writes random characters to the entire drive." Rubberhose is also mentioned in Schneier on Security, Deniable File System, April 2006, https://www.schneier.com/blog/archives/2006/04/deniable_file_s.html The use of common mass storage devices for storing one-time pad was described Apr. 1, 2005 in an edit to the Wikipedia article on "One-time pad", said edit being recorded as https://en.wikipedia.org/w/index.php?title=One-time_pad&type=revision&diff=11771171&oldid=11763901. This use was illustrated the point with a photograph https://commons.wikimedia.org/wiki/File:PersonalStorageDevices.agr.jpg, that photograph being still in use in the article as of Apr. 20, 2017.

SUMMARY OF THE INVENTION

Embodiments disclosed herein, provide a more secure system and method for securely storing and utilizing password validation data than conventional password management systems. In one embodiment, a technique for password authentication includes obtaining a user id and a password as input on a password management module (PMM), generating a salt on the password management module, securely sending a message including the salt to a restricted secret server (RSS) having a very large key (VLK) module, generating a block of unpredictable data by a cryptographically-strong bit stream generator and loading the block of unpredictable data into the VLK module. In this embodiment, the block of unpredictable data stored in the VLK module has a size such that a time to transfer the block of unpredictable data deters exfiltrating the block of unpredictable data out of the restricted secret server. The technique further includes using the salt included in the message as a seed for a deterministic random number generator (DRNG) on the restricted secret server, using the seeded DRNG to select multiple subsets of data from the block of unpredictable data, combining the multiple subsets of data from the block of unpredictable data to form a password authenticator token, securely sending a return message including the password authenticator token to the password management module, combining the password authenticator token with the password to form an input to a cryptographic hash function, the output of which is a password authenticator field and storing the salt and the password authenticator field in a storage record associated with the user id in a database on or accessible from the password management module.

Such a technique offers a number advantages over current password management techniques:
Dependable, engineered security;
No more password arms race;
Quantum computing resistant;
No additional burden on users;
Relaxed password complexity requirements, i.e. less need for complex passwords;
Reduced risk and liability for the organization operating the computer system;
Minimal changes to existing password management software and database;
User password validation data can be safely backed up using organization's existing practices;
The VLK is large enough to be physically protected;
All components can be completely under the control of the customer;
Easy transition from current methods; and
Fallback plan available if needed.

In another embodiment the technique further includes sending user-specific information and/or enterprise-specific information from the PMM to the RSS and using the information in addition to the salt to form the password authenticator token.

In still another embodiment the technique further includes using the password authenticator field to authenticate the user id and the password received in a login attempt. In another embodiment the technique further includes authenticating the password in the password management module or in the restricted secret server.

In another embodiment securely sending a message to the restricted secret server includes sending the message via a secure, authenticated link to a data guard, authenticating the message on the data guard and forwarding the message via a dedicated link to the restricted secret server. In another embodiment securely sending a return message to the password management module includes sending a return message via a second dedicated link to a data guard from the restricted secret server, authenticating the return message on the data guard and forwarding the return message via a secure, authenticated link to the password management module. In still another embodiment the technique further includes limiting a rate at which messages are passed between the restricted secret server and the password management module.

In another embodiment the VLK module is removable from the restricted secret server and the technique further includes providing a secure interlock between the VLK module and the restricted secret server. In another embodiment the removable VLK module is in a sealed unit designed to plug only into a corresponding restricted secret server. In another embodiment the sealed unit uses non-standard connector pin-outs. In another embodiment the sealed unit uses a body that mechanically interlocks with a restricted secret server housing. In another embodiment the sealed unit uses non-standard connector pin-outs and mechanically interlocks that are custom designed for each customer installation. In yet another embodiment the technique further includes sending the message and return message between the password management module and the restricted secret server fixed in size to prevent buffer overflow attacks. In another embodiment transferring the block of unpredictable data takes longer than ten minutes.

In one embodiment a system for password authentication includes a password management module (PMM), a restricted secret server (RSS) having at least one very large key (VLK) module, a restricted secret server network interface (RSS-NI) interconnecting the RSS with the PMM and a data guard disposed between the RSS-NI and the VLK module, and a VLK and the VLK module are large enough to deter unauthorized transfer of the VLK out of the RSS. In another embodiment the VLK module further includes a VLK module alarm which is triggered when the VLK module is removed from the RSS. In another embodiment the VLK module alarm comprises an optical sensor. In another embodiment, VLK module includes a plurality of grooves and flutes to prevent insertion of an unauthorized VLK module into the RSS. In another embodiment, the VLK module includes storage which includes a solid state drive (SSD), a rotating hard disk or a NOR flash memory. In still another embodiment, the VLK module includes storage which includes a memory device including a control processor having non-standard firmware such that said memory device's control commands differ from control commands of a corresponding standard memory.

A computer readable storage medium for tangibly storing thereon computer readable instructions includes instructions for securely storing and utilizing password validation data. Embodiments of the invention include any type of computerized device, workstation, handheld, tablet or laptop computer, field-programmable gate array, or the like configured with software and/or circuitry (e.g., a processor) to process any or all of the method operations disclosed herein. In other words, a computerized device or a processor that is programmed or configured to operate as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk, solid state drive, or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. Other configurations include web applications, browsers, IP applications and data enabled device applications as will be explained in more detail.

It is to be understood that the features of the system and method for securely storing and utilizing password validation data can be embodied strictly as a software program, as software and hardware, or as hardware alone such as within a single processor or multiple processors, within a virtual machine, or within an operating system or within a software application. Security features of the VLK module can be embodied as mechanical devices alone or in combination with hardware and software devices.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention. These and other features of the invention will be understood from the description and claims herein, taken together with the drawings of illustrative embodiments, wherein:

DETAILED DESCRIPTION OF THE INVENTION

There is a need to end the password arms race once and for all. Embodiments of the present invention are intended to be impregnable to the attacks described above. Combined with software-imposed limits on failed login attempts, these embodiments offer full security even with relatively simple passwords. Certain embodiments combine unique hardware features with techniques to improve the security operations of conventional systems as described below.

Figure 1:
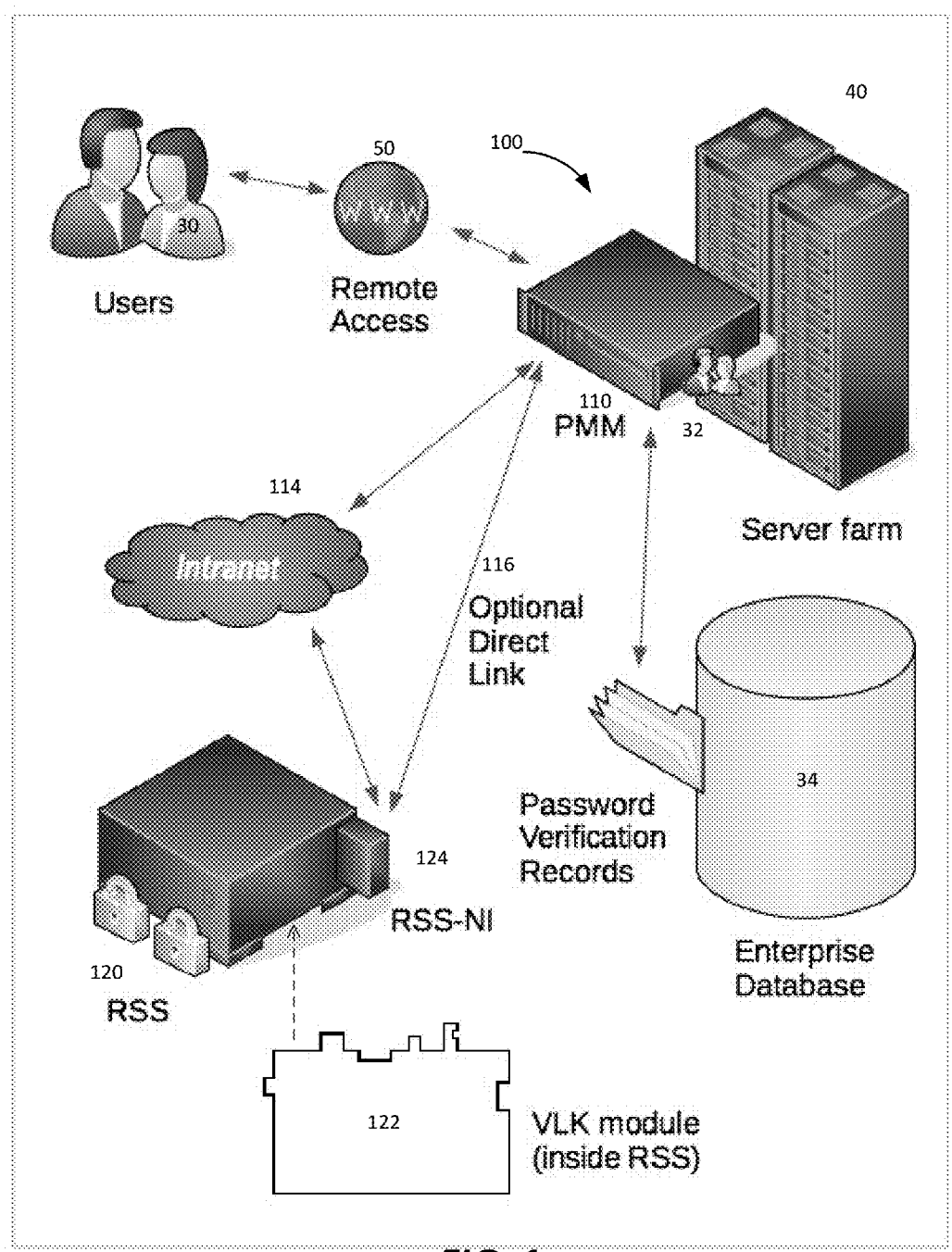
FIG. 1 is a block diagram of a system for securely storing and utilizing password validation data according to embodiments herein.

Referring now to FIG. 1, an exemplary system 100 for securely storing and utilizing password validation data includes a password management module (PMM) 110 connected to a restricted secret server (RSS) 120. The RSS 120 includes a very large key (VLK) module 122 which in one embodiment is inside the RSS 120 and in another embodiment is removable from the RSS 120.

A multiuser computer system server farm 40 can be integrated with system 100. The server farm 40 represents one or more computers. Users 30 connect to the server farm 40 in a variety of ways, including the Internet World Wide Web 50, local area networks (not shown) or hard-wired lines (not shown). When first connecting or when requesting access to a new resource or when authentication is needed for some other reason, the user is connected to the password management module (PMM) 110. In various embodiments the PMM 110 can be a computer program, a separate server or a virtual machine. The PMM 110 accesses a corporate/enterprise database 34 or some other storage system to retrieve password records 32. The password record 32 includes information needed to verify the user's identity.

It has been discovered that the addition of the RSS 120 enhances password security. Instead of relying entirely on the information stored in the password records, the PPM 110 accesses the RSS 120 during of the verification process. The RSS 120 includes secret keying information that is stored in the VLK module 122. The RSS 120 communities with the PMM 110 via an RSS network interface (RSS-NI) 124 and some communication links such as a dedicated connection 116 or the existing corporate intranet 114.

The system's secret component can be physically secured in a safe and connected to the server network by devices designed to minimize data leaks. Security can be as good as the physical security and local access supervision afforded to the secret component. Unlike conventional symmetric cryptographic keys and the asymmetric private keys used to protect electronic commerce, which are often less than a kilobyte in size, the secret data used is designed to be a very large key (VLK) of unpredictable data and therefore difficult to copy or transfer and exfiltrate by covert means. The VLK secret data, referred to herein as the restricted secret, can be constructed large enough so that copying it requires many minutes, allowing traditional physical security measures such as high quality safes, alarm systems, video surveillance and two-person integrity rules to be effectively employed to protect the restricted secret data used in the present invention. These security measures would detect a person trying to copy the VLK data in time to allow security intervention, such as by security guards, before a significant amount of data had been copied. The techniques used in embodiments of the present invention are designed to prevent damage if a small portion of the restricted secret leaks, so even if an attacker somehow gains undetected physical access inside the restricted secret server for a few minutes, the amount of data they can copy during that time is not enough to compromise the system.

More than one RSS 120 can be attached to a network for operational continuity in case of equipment failure. While the contents of the VLK can take a long time to copy, this only needs to be done once for each VLK needed. The restricted secret does not need to be updated, so periodic backups are not needed, eliminating another avenue for attack. A master copy can be stored offline, preferably in a vault, and separate from the corporate backup system. Because it only requires a simple modification to existing password management techniques, embodiments of the present invention can be added to existing multi-user computer systems with minimum software changes.

The system comprises the password management module (PMM) 110 and the restricted secret server (RSS) 120. These are connected by a communications channel, such as Ethernet or a special purpose protocol, and, optionally via a Data Guard (DG) (FIG. 2) to provide additional security.

Password Management Module (PMM)

The PMM 110 includes features to allow individual user password verification records to be created, updated and verified. Existing login control software can be a modified to include this feature. One potential change needed for the password database is a version field in the user records to indicate whether that record has been upgraded to the new method. Many user password databases, such as Unix systems, already include a suitable version field.

When asked to create a new password, the PMM 110 sends the RSS 120 a message, in one embodiment a datagram packet, including a message ID and the salt selected to be stored for the new password. In another embodiment the password would be included in addition. These two alternatives are described below in further detail. The RSS 120 returns a bit string, the password authenticator token (also referred to as the restricted secret token). The PMM 110 hashes that token with the new password and stores the result in user's record in the password database. Any standard cryptographic hash or hash-based message authentication code (HMAC) can be used, though HMACs based on SHA-2, SHA-3 or Blake2 are preferred. For password verification the same message exchange takes place except the hash value calculated using the password authenticator token is compared with the hash value stored in the user's record.

The password authenticator token is erased after the hash is formed. This is a security best practice on the PMM 110, but it is similar to requiring login software to erase the plaintext password after using it to create the hash value to be stored in that password's validation record during account creation, or using it to validate a supplied password during login. Messages between the PMM 110 and the RSS 120 can be encrypted for added security, especially if the messages are transported on a shared network.

The Restricted Secret Server (RSS)

The RSS 120 produces a repeatable pseudo-random token in response to each incoming message from the PMM 110. One way to do this might be for the RSS 120 to generate a keyed hash of the incoming message content using a secret key stored in the RSS 120. One problem with that approach is that there is a risk that the secret key could be leaked via a side channel attack or stealthily purloined by an insider. Side channel leaks from, e.g. electromagnetic radiation (Tempest), active electromagnetic illumination (radar), covert implants, power line fluctuations and even acoustical noise are notoriously hard to suppress. Even if the keyed hash were included in a FIPS-140 Hardware Security Module, the potential for surreptitious key theft exists. This can be due to data leakage from side channels if a short key is employed, as the electronics will access the same key many times per second, generating signals that are hard to shield completely. Also, unlike for many HSM applications, there is a need to make copies of the key used for password authentication, since loss of that key, say due to a hardware failure, would make it impossible to quickly authenticate users, an unacceptable outcome for a large enterprise.

One approach is to use as a secret key a long string of random or otherwise unpredictable data, referred to as a very large key (VLK). In various embodiments, the VLK is perhaps hundreds of gigabytes, terabytes, tens, hundreds or thousands of terabytes. The large key size is not primarily intended to increase security against cryptanalytic attack. Much smaller key sizes, e.g. 256 bits, are currently considered impregnable for symmetric ciphers. The vastly larger size of the VLK is intended to reduce the number of times each key byte is reused to a small number on average and to make theft of the secret key difficult or impossible by requiring a long enough time to copy or transfer it so that physical security measures can be initiated to halt the copying before large portions of the secret key can be copied.

In one embodiment the VLK module 122 is removable from the restricted secret server 120. In another embodiment, the removable VLK is stored in the RSS 120 which along with the RSS 120 computing resources is stored in a strong physical enclosure (not shown). A secure interlock between the VLK module 122 and the restricted secret server can also be provided. In another embodiment, the removable VLK module 122 is in a sealed unit designed to plug only into a corresponding restricted secret server 120. In yet another embodiment, the sealed unit uses non-standard connector pin-outs, the sealed unit uses a body that mechanically interlocks with a restricted secret server housing or the sealed unit uses non-standard connector pin-outs and mechanically interlocks that are custom designed for each customer installation.

In both the various embodiments, the salt data in the incoming message is used to seed a pseudo-random number generator (PRNG). This PRNG, in turn, would be used to select a string of random values from the VLK. In the case of a block-structured device, such as NAND flash or a rotating hard drive, some number of randomly selected blocks or pages (say 6) would read and then a string of bits, say 256 (32 octets), would be pseudo-randomly selected from the contents of those pages using the seeded PRNG. The selected bits from all the pages would be concatenated to form the password authenticator token. For extra security the selected bits from all the pages could be hashed by a standard cryptographic hash, such as SHA-2 or 3 or an HMAC with a separate secret key. The needed number of bits for the password authenticator token to be returned would then be extracted from the hash output.

It is difficult, if not impossible, to reduce the rate of side channel leakage to a point where compromise of a typical cryptographic key, typically only a few hundred bits long, can be reliably prevented. But preventing the leakage of significant portions of a multi-gigabyte or terabyte key is more feasible. The RSS 120 parameters can be chosen to sample many parts of the VLK for each authentication, so that leakage of a small fraction of the VLK, the amount an attacker could possibly copy in a time short enough to evade detection by security surveillance and alarms, is unlikely to allow the attacker to recover user passwords.

simply recover the plaintext passwords, which are present in the PMM 110 whenever a user logs in or creates a new password.

One embodiment of the present invention, avoids creating a conventional salted password hash, so that line of attack is completely foreclosed. Also by using some or all of methods disclosed herein to protect the VLK, it can be safely stored locally, avoiding the need for transmitting password verification information over long distances with each login transaction and the attendant risk of a denial of service attack on those transmissions.

The operation of the RSS 120 in one embodiment can be described by the following pseudo code:

```
// RSS pseudo code
Start: Wait for frame ready signal on input
Read Frame_length bits from input
If checksum invalid go to start
If instruction_code == check status
    Assemble status information
    Fill output frame buffer with messageID, status information
    Go to checksum
If instruction_code! = calculate_ go to start
// Password authenticator token calculation
Initialize PRNG with frame's salt payload as seed
Initialize output_buffer to zero length
Initialize key_buffer to zero length
Initialize page_buffer to zero length
Initialize TK_address_array to (0, 1, ... number of VLK modules)
Using PRNG randomly shuffle TK_address_array
for i = 1 to number_of_VLK_modules
    Select a page from the VLK module (TK_address_array(i))
    Using PRNG randomly select Bytes_per_module bytes from page and append them to key_buffer
end
If (number_of_VLK_modules < desired_VLK_module_accesses) then
    for i = 1 to (desired_VLK_module_accesses - number_of_VLK_modules)
        Select a random number k from the range (0 ... desired_VLK_module_accesses - number_of_VLK_modules)
        Select a page from VLK module (k)
        Using PRNG randomly select Bytes_per_module bytes from page and append them to key_buffer
        Append page to page_buffer
    end
// optional step
for i = 1 to number_of_additiaonal_bytes
    Using PRNG randomly select Bytes_per_module bytes from page_buffer and append them to key_buffer
end
// end optional step
Hash key_buffer using a pre-selected cryptographic hash, HMAC or block cipher (e.g. SHA-1, SHA 2, SHA-3, AES, Speck), possibly different for hash used in Data Guard
Fill output frame buffer with messageID, hashed key_buffer
// hashed key_buffer is the password authenticator token
Checksum: Calculate new checksum
insert checksum in output frame buffer
Raise frame ready signal on output
Transmit output frame buffer
Go to start
```

Even though both Blind Hashing (BH) and embodiments of the present invention use large blocks of random digital bit to help secure passwords, there are several differences in these techniques. In contrast to Blind Hashing Techniques (described above), embodiments of the present invention avoid the need to incorporate the password in a first hash by using a secure link within the data center's corporate intranet 114 to access the RSS 120, or, in other embodiments, using a direct communication link 116 between the PMM 110 and RSS 120. In the later case only the PMM 110 can possibly query the RSS 120. While it is possible that altered software in the PMM 110 could maliciously access the RSS 120, an attacker who can compromise the PMM 110 software can RSS Network Interface The RSS Network Interface (RSS-NI) 124 includes a computer or other digital logic device that connects to the PMM 110, in one embodiment, via a standard network connection, such as Ethernet, using TCP/IP or perhaps using UDP datagrams for performance. In another embodiment, a direct communication path 116 connects the PMM 110 with the RSS 120, perhaps using USB, RS-232, RS-422, I2C or a fiber optic link. In the absence of a delivery guarantee, the PMM 110 could maintain a queue of request messages and resend if one was not responded to within some time window. Communications between the PMM 110 and the RSS-NI 124 could be encrypted, perhaps using standard technologies such as SSH, VPN, TLS, public key cryptography, or perhaps a proprietary protocol. The RSS-NI 124 need not be inside the RSS 120 secure container 120. The RSS-NI 124 communicates with the RSS 120 directly or, for added security, through the Data Guard as described below in conjunction with FIG. 2. If a direct link 116 is used, the PMM 110 could communicate directly with the Data Guard. The message format is highly constrained and fixed in size in either case, to prevent attacks such as buffer overflows or crashes due to poor handling of invalid message formats. Invalid messages are easy to detect and can simply be discarded.

In contrast to conventional techniques, the VLK is static. It can be copied offline in a secure environment when additional restricted secret servers are needed. Once in place, no additional backup or synchronization between restricted secret servers is needed.

Figure 2:
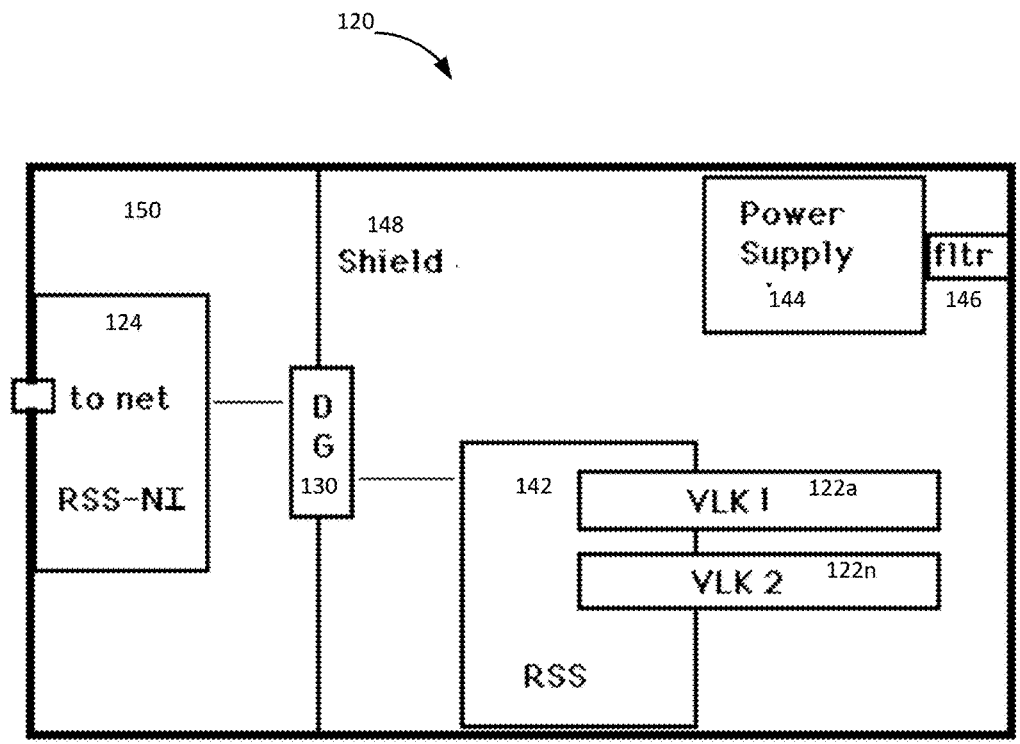
FIG. 2 is a schematic illustration of the restricted secret server (RSS) of FIG. 1 in accordance with one example embodiment disclosed herein.

FIG. 2 is a block diagram of the exemplary RSS 120 showing additional details. The RSS 120 includes two compartments 140 and 150. Compartment 150 includes the RSS-NI 124. Compartment 140 includes a housing 142 that can be locked, such as a metal safe, a separate power supply 144 and a filter 146. In one embodiment, an electromagnetic shield 148 disposed in compartment 140 separates the two compartments 140 and 150 electromagnetically and further shields the components within compartment 140. The compartments 140 and 150 preferably have separate power supplies. The power inputs to the power supplies pass through filters that attenuate any data signals exiting via the power lines. The RSS 120 includes an RSS processor (not shown), the VLK module(s) 122a-122n (collectively VLK module 122) and the RSS Network Interface 124. The RSS 120 further includes a Data Guard 130 which is disposed between compartments 140 and 150. The only data connection between compartments 140 and 150 is the Data Guard 130, which restricts and sanitizes the data passing between the RSS-NI 124 and compartment 140.

Data Guard

In one embodiment, physical security for the VLK module 122 is enhanced to follow the red/black concept suggested by the U.S. National Security Agency. The secret VLK data, considered red data, is enclosed in an electromagnetically shielded physical container such as a metal safe or a shielded compartment within a safe, or enclosed in some other Faraday cage shield. All signal connections pass through one or more special computing modules called Data Guards, that enforce message formats in both directions and restricts the rate at which information can leave the enclosure. The Data Guard may also apply an additional cryptographic hash to the output from the RSS 120 to further prevent information leakage. The Data Guard would ideally be a Harvard architecture processor, meaning that no data or code executed in the processor can affect its stored program. The Data Guard's firmware program is simple enough that it should not need updating, but if updating was needed, physical access to the module via opening the safe might be used for security, perhaps with two person integrity measures.

Data Guard Operation

The function of the Data Guard 130 is to limit the amount of data coming out of the RSS 120 and to protect the RSS 120 from malware. The Data Guard 130 provides an interface between the RSS-NI 124 and the RSS 120 itself. The Data Guard 130 is the only data connection for the RSS 120 in normal operation. The Data Guard 130 design treats both the RSS-NI 124 and the RSS 120 as untrustworthy. Messages communicated through the Data Guard 130 are generally fixed in length and format. Data Guard 130 can check a message authentication code (MAC), perhaps based on a secret shared with the PMMs 110. The Data Guard 130 discards messages that are invalid.

The Data Guard can optionally handle traffic in both directions between the RSS-NI 124 and RSS 120 or there can be separate Data Guard 130 units for each direction. The multiple Data Guard 130 option might be appropriate operations where only a go/no-go signal is sent from the RSS 120. Data directionality might be enforced using optical isolators on the signal lines. The Data Guard 130 can optionally be potted to prevent software updates. If an update is necessary a new Data Guard 130 unit would be procured. The Data Guard 130 can use non-standard connectors, perhaps with more pins than necessary and scrambled proprietary wiring connections that could be checked by the Data Guard 130 and the units it is connected to. The Data Guard 130 can match outputs with requests, insuring no output passes to the RSS-NI 124 unless a request with the same message ID had been sent to the RSS 120. For example it might maintain a table of message IDs from each request sent to the RSS 120 and only allow replies from the RSS 120 with a matching ID, after which that ID would be removed from the table, insuring that the ID was only replied to once.

The Data Guard 130 could separate sensitive data such as the password authenticator token or password from the user's identity using a random message ID it generates before passing the information to the RSS 120. That way the RSS 120 would have no way to know the user identity associated with the data it is processing.

The Data Guard 130 can further protect the VLK from leakage by limiting the rate at which messages received from the RSS 120 are retransmitted to the PMM 110 to a level consistent with expected login, account creation and password change usage rates. These rates could vary by time of day, day of week, holidays (e.g. Christmas season) or special events (e.g. a public report of a major data breach somewhere).

The Data Guard 130 could further protect the VLK from leakage in Mode 1 by scrambling the reply with an additional cryptographic hash step, such as SHA-2. Even if malicious software had somehow been executed in the RSS 120 that attempted to leak VLK content, the hash step in the Data Guard 130 would prevent useful information from being transmitted. Another possible hash mode might be to use the password authenticator token returned from the RSS 120 as the key to a block cipher and encipher either some constant value (e.g. zero) or the password authenticator token returned from the RSS 120.

The Data Guard 130 might limit the frequency of alarm messages, or diagnostic or status requests to a rate low enough that no significant fraction of the VLK could be leaked by a malicious RSS 120 via such messages. A higher rate would be permitted when the diagnostic enable key switch or both switches, if there are two, is turned on. The Data Guard 130 could be constructed in several ways including with a microprocessor, or integrated circuits such as a field-programmable gate arrays (FPGA), complex programmable logic devices (CPLD) or application specific integrated circuits (ASIC).

The operation of the Data Guard 130 in one embodiment is described by the following pseudo code:

```
// Data Guard pseudo code
Start: Wait for frame ready signal on input
Read Frame_length bits from input
Calculate Frame checksum
If checksum invalid go to start
```

```
If instruction code invalid go to start
Fill output frame buffer with messageID, instruction code, payload
Calculate new checksum
Insert checksum in output frame buffer
Raise frame ready signal on output
Transmit output frame buffer
Go to start
```

Data Guard pseudo code for an alternate embodiment

```
Start: Wait for frame ready signal on input
Read Frame_length bits from input
Calculate Frame checksum
If checksum invalid go to start
If instruction code invalid go to start
hash payload field using a pre-selected cryptographic hash or block cipher
(e.g. SHA-1, SHA 2, SHA-3, AES, Speck, HMAC), possibly keyed with
secret key
Fill output frame buffer with messageID, instruction code, hashed
payload
Calculate new checksum
Insert checksum in output frame buffer
Raise frame ready signal on output
Transmit output frame buffer
Go to start
```

The functions of the RSS-NI 124, Data Guard 130 and RSS 120 are preferably performed in three separate computing devices for maximal security, but these functions could be combined in one or two computing devices, if other considerations, such as cost or throughput, are greater concerns, or if a direct connection 116 between the PMM 110 and DG 130 is used.

Figure 3:
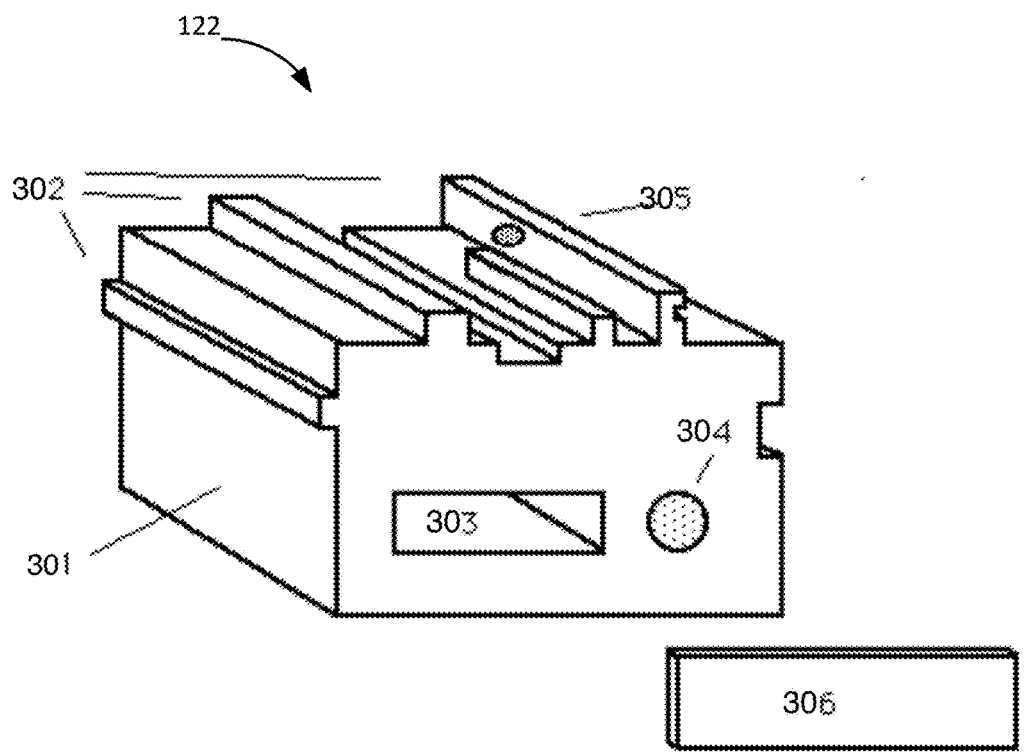
FIG. 3 is a schematic illustration of the very large key (VLK) module of FIG. 1

Now referring to FIG. 3 an exemplary VLK module 122 includes an energy storage device 304 (e.g., a battery), several grooves and flutes 302, a cavity 303 for receiving a memory module (not shown), a cover 306 and an optional optical sensor 305. The grooves and flutes 302 are designed to fit in a corresponding mating receptacle in the RSS 120. The cavity in the module houses a memory module and possibly an alarm microprocessor to detect removal or tampering and take preventive measures such as erasing the memory modules. The grooves and flutes 302 can also prevent insertion of an unauthorized VLK 122 module into the RSS 120. In one embodiment, the VLK module 122 is made from a strong material such as aluminum, steel or plastic. The energy source 304 is included to give the alarm processor time to act after removal of external power. The VLK module 122 has interlock features that the receptacle interfaces with to allow an RSS processor and/or a processor in the VLK module 122 to detect the modules removal. For example, the optical sensor 305 might be mounted in a groove on flute 302. A cover 306 securely closes the cavity 303 and a battery compartment so that unauthorized access to them is delayed long enough to allow the alarm processor to act. The cover 306 might be welded on or glued on or attached with tamper resistant fasteners and might incorporate radio frequency gaskets to prevent signal leakage.

Figure 4:
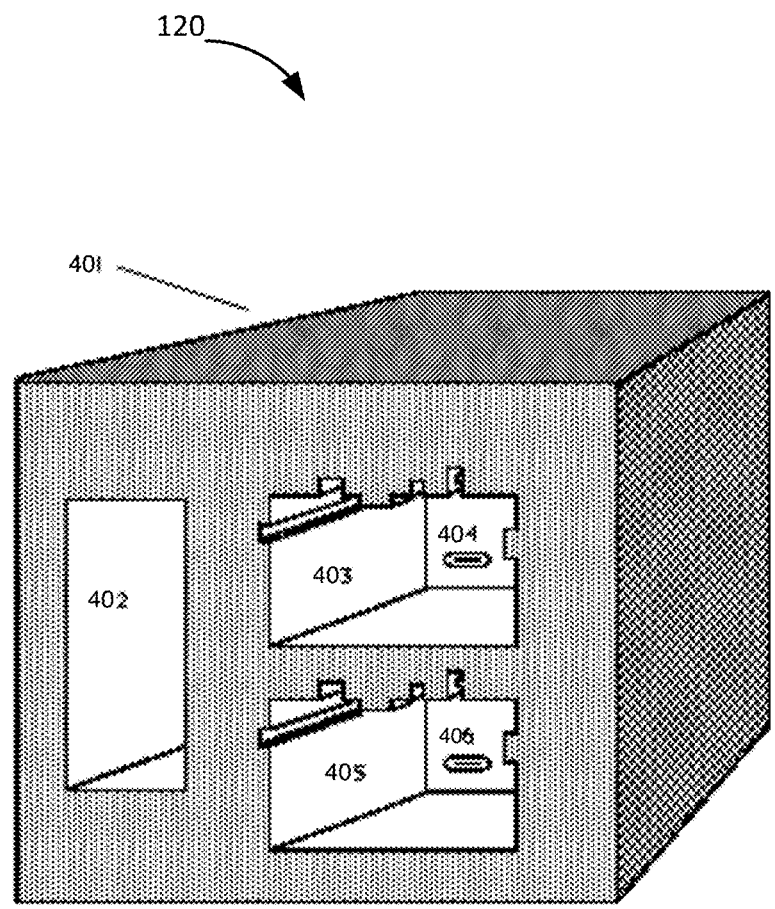
FIG. 4 is a schematic illustration of an RSS enclosure housing the RSS of FIG. 2.

FIG. 4 shows an exemplary RSS enclosure 401. Two receptacles 403 and 405 for VLK modules 122 are provided in this example. Each receptacle is mechanically keyed with flutes and grooves 403 and 405 to match the mechanical keying grooves and flutes 302 on the VLK module 122. For added security the pattern of grooves and flutes and connector wiring can be customized for each enterprise customer, so that a VLK stolen from one customer cannot be easily read on another customer's RSS 120. Each receptacle 403 and 405 includes connectors 404 and 406, respectively, that the VLK module 122 plugs into for signals and power. Compartment 402 houses the RSS processor (not shown).

Physical Security

The design of VLK 122 makes threats mounted from actors external to the organization, i.e. with no physical access to the equipment, very difficult if not impossible. However the VLK 122 itself becomes a valuable, concentrated target and should receive physical protection above simply being inside a restricted and guarded server room. Because there is no need for routine physical access to the restricted secret server, it can be locked in a secure container, such as a safe. Safes are available commercially that meet U.S. General Services Administration specifications for classified material. Some models include two combinations to support two-person-integrity (TPI) rules. Models designed to hold electronic equipment are available. Such safes offer around 20-hour resistance to manipulation of the dial access by attackers. They therefore would be supplemented with tamper alarms and video surveillance. Because of their weight, they might be mounted at the bottom of an equipment rack or bolted to the floor.

Existing data centers generally have security systems including perimeter alarms and video surveillance with digital video recorders (DVRs). The restricted secret enclosures would tie into those systems with tamper alarms on the enclosures, which might also have dedicated cameras watching them. DVRs typically have alarm inputs that can tag video associated with an alarm event and even send the video to a remote monitoring station. They can also detect motion in a secured area and signal an alarm. Logs of authorized access to the VLK system might be maintained on paper forms to prevent digital tampering. Backup copies of the VLK 122 might be stored in a vault, perhaps in a secure container with dual padlocks.

An all metal safe could serve as a heat sink, allowing higher power burst operation during peak times. If necessary, heat exchanger fins for thermal dissipation could be mounted on outside of the safe, perhaps with cold aisle exposure for data center that segregate hot and cold airflows.

Other security measures could include:

Tamper evident seals on backup VLK modules and their connectors in storage, (e.g. Evidence bags);

Detection of attempts to manipulate the safe combination dial or dials without authorization;

Creation of a no-lone-zone perimeter around the RSS 120 with motion detection; a person acting alone within the zone would trigger an alarm;

Using a DC power supply 144 with a low pass filter 146 at the input to the RSS 120; Using dual power supplies for reliability and to allow hot-swap of the power supply;

Separate filtered power for the Data Guard;

Using optical fiber data links into the RSS-NI 124 and other communication links in the system to prevent Tempest leakage over signal wires; and Using laser power sources or compressed air with a turbine, to supply power to the RSS and VLK, thereby eliminating electrical power wiring that can allow data leaks. If both fiber optic communication links and fiber optic power are used, with both power and signal fibers routed through small holes or channels to take advantage of the waveguide cutoff effect, and proper radio frequency gasketing measures are taken around doors and access covers, leakage of side channel signal from the RSS 120 and VLK 122 can be practically eliminated.

Two-person-integrity could be enforced by having two locks on the cabinet and two key switches for diagnostic mode. Alternately one key switch and a remote signal, perhaps cryptographically signed, could suffice, for situations where the staffing level at the data center is low.

Figure 5:
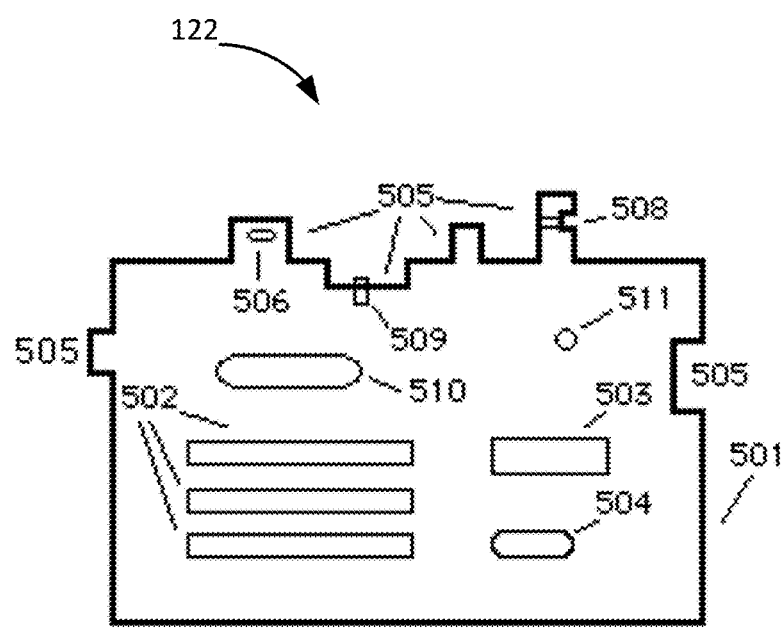
FIG. 5 is a schematic illustration VLK module of FIG. 1

FIG. 5 depicts several additional components that can be included in VLK module 122. In addition to the memory modules 502 (at least one should be present) and an electrical connector 510 to supply power for the memory module and to provide signal lines for communication with the RSS processor. The other elements in FIG. 5 enhance security and the exact combination, including the possibility of more than one of each element, would be chosen based on cost, security and reliability considerations. These elements include an alarm processor 503, an energy storage device 504, grooves and flutes 505, a magnetic or proximity switch 506, a hole to allow a sensor's light to pass through 508, a switch that is depressed when the module is inserted into the receptacle 509 and a status indicator light 511.

There are several options for the VLK module 122. One purpose of the VLK module 122 is to make surreptitious exfiltration of the security secret infeasible. As such it should include enough data so that only a large physical medium can hold it and to require long time to copy its content. Some levels of physical security might include insuring that the memory modules are big enough so they cannot be exfiltrated in a briefcase, shirt pocket, other article of clothing, service animal or a body cavity.

Options for storage in the VLK include:

Solid state drives:

With present technology, the preferred medium for the VLK is solid state NAND flash memory. Solid state drives (SSDs) use NAND flash memory technology and error-correcting codes for reliability. Random access times are good, but NAND flash is organized as a block transfer device. Blocks are in turn subdivided into pages, typically 4K Bytes. The RSS 120 allows for this limitation. There is no requirement for writing to the memory after VLK creation, which eliminates most the write-wear problem associated with flash memory. The only additional writes are likely to come from built-in error correction. Some SSD's will rewrite data blocks after detecting a correctable error. The impact of such occasional writes in this setting is likely small, but needs to be evaluated. It might be necessary to replace the SSD modules every few years. An alternative might be employing deeper error-correcting codes that can fix more errors.

Many SSD memory devices have a built-in drive encryption feature. This feature can be used as a VLK emergency erase mechanism. The built-in drive encryption software could be configured to erase the data encryption key if tapering is detected severe enough to indicate a security breach, for example opening the safe door or removal of a VLK module 122 without a separate authorization signal.

Some SSD drives implement a Secure Erase command that might also be used. In some models this feature is implemented by applying a higher voltage to the NAND flash to reset all its bits in parallel. The VLK module 122 could include a source of energy 304, such as a backup battery or super capacitor, to ensure enough electrical energy is available to carry out the erasure. Direct physical destruction techniques such as Thermite or corrosive substances could be used to destroy the memory modules, though the safety considerations might outweigh the security advantage.

Solid state drives include a microprocessor control device. It might be advantageous to customize the firmware in the device for VLK module 122 use. Doing this might allow an automatic erase on tamper detection capability, for example. There may be performance optimizations such as queuing that are possible for the specific nature of VLK module 122 data requirements. Also command codes might be changed from the standard commands to a proprietary version so that off the shelf software would not be able to access the VLK module's 122 solid state drives. While this is a form of "security by obscurity," it would still be a useful part of defense in depth.

Rotating hard disk:

Rotating hard disk drives currently offer the lowest cost per gigabyte of storage, but they are not well suited for random access, limited by substantial delays for arm movement and rotation latency. They are also block organized. If a rotating hard disk is used to store the VLK, access requests could be batched and sorted into the order they appear as the disk rotates, to minimize access time.

NOR flash:

NOR flash offers direct random access to any byte, but it is significantly more expensive per bit than NAND flash. NOR flash is otherwise suitable for storing the VLK.

Solid state RAM:

DRAM and SRAM offer very fast random access, but are relatively expensive and generally require a constant power source to retain data long term. This power can be provided by battery backup or super capacitors. Using DRAM or SRAM for VLK or working storage would allow physical security measures that detect tampering to cause the memory to lose power, erasing or at least degrading its content.

New memory technologies:

New memory technologies, such as ferroelectric RAM and memory resistors, are promising, but still very expensive per bit. Other technologies under development may also be suitable.

Non-clone-able memory devices:

While non-clone-able memory has security advantages, customers are likely to demand multiple RSS 120 devices for reliability and backup. One could have several different non-clone-able memory modules and store separate hashes for each on in the user password database.

In another embodiment, the VLK module 122 can include storage which has a memory device including a control processor having non-standard firmware such that said memory device's control commands differ from control commands of a corresponding standard memory. In another embodiment, firmware used for different customers might have different control commands. In case the VLK module 122 is compromised, the use of non-standard firmware might reduce the chance that the unpredictable data block/VLK is removed from the VLK module 122 or that an unauthorized VLK is substituted for the trusted VLK.

Figure 6:
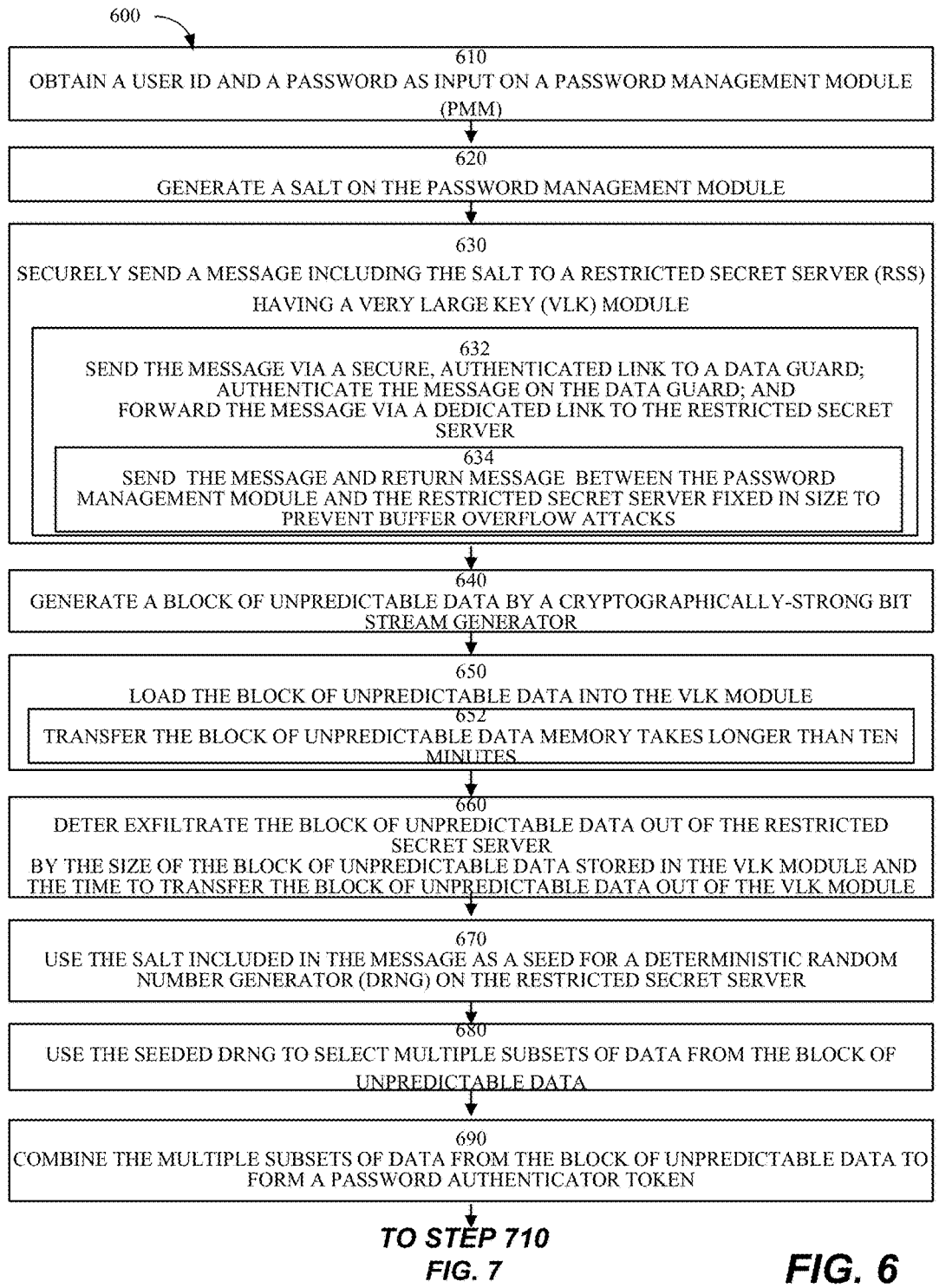
FIG. 6 is a flow chart of processing steps performed to generate a password authenticator token in accordance with embodiments disclosed herein.

In FIG. 6, flowchart 600 diagrams the overall process of the password registration process. In step 610, a user id and a password as input on a password management module (PMM) 110 are obtained. In step 620, a salt on the password management module is generated. In step 630, a message including the salt is securely sent to a restricted secret server (RSS) 120 having a very large key (VLK) module 122. In one embodiment in step 632, the message is sent via a secure, authenticated link to the Data Guard 130, authenticated on the Data Guard 130 and forwarded via a dedicated link to the restricted secret server 120. In step 634 in another embodiment, the message between the password management module and the restricted secret server is sent fixed in size to prevent buffer overflow attacks. The return message can also be sent fixed in size.

In step 640, a block of unpredictable data is generated by a cryptographically-strong bit stream generator. It is understood that generally the generation of the unpredictable data needs to only be done once for each customer, but for security reasons (e.g. if there was a compromise of a VLK module 122) or other reasons (e.g., replacement of a VLK module 122 when copying from another VLK module 122 is not possible) the generation step can be repeated as often as necessary. VLK generation can be accomplished several ways:

Generating the restricted secret:

The VLK module 122 can be filled with bytes or bit that are close to statistically independent and uniformly distributed and should be unpredictable. This normally only needs to be done once for each VLK. All VLK modules 122 s in a single installation should have the same restricted secret. So the restricted secret typically only needs to be generated once per customer. Several methods for generating this data include:

Using a true random bit source:

In this approach all the bits needed for a VLK restricted secret are generated by a hardware random number generator. One possible source of random bits is a video digitizer connected to a wide-band noise source. One terabyte of storage can hold about 4 hours of video at 720p resolution, so this would be a good approximation of the speed at which a VLK module 122 could be filled.

Using a combined source:

The VLK restricted secret can be generated by a DRNG that is periodically reseeded from a true random bit generator. For example, Intel's built-in random number generator combines a deterministic RNG with periodic reseeds from a true entropy source. Intel claims its entropy source produces 3 gigabits per second and its RDrand instruction can achieve 800 MB/s with multiple threads. As another example, well-known techniques such as Yarrow and Fortuna could be used to periodically add entropy from a true random bit source to a pseudo-random bit generator to generate a VLK restricted secret.

Randomly seeded DRNG (per NIST SP 800-90):

Another approach to generating a VLK restricted secret is to use a deterministic random number generator that is seeded with a short secret key, say of 256 bits. The short secret key could be destroyed after use or it could be recorded, perhaps in a paper document. If recorded it could serve as an emergency backup, allowing the VLK restricted secret to be regenerated. Of course, the short secret key would have to be closely guarded. The short secret key could be generated using a M out of N secret sharing technique that would require M separate key holders out of a total of N key holders to agree to reconstruct the VLK.

Good software implementations of AES run at about 15 clock cycles per byte. (https://cr.yp.to/aes-speed.html) On Intel Core and AMD FX CPUs supporting the AES-NI instruction set extensions, throughput can be over 700 MB/s per thread.

Ceremony:

Production or copying of the VLK might involve a ceremony with one or more witnesses, possibly recorded on video, following a specific script. Given the length of time required, the desired operation might be set up and initiated, then sealed in a safe and left over night or however long it is estimated to take. Video surveillance with motion detection and/or human guards could protect the safe while the operation completes. Several copies of the VLK might be made in parallel to support multiple RSS 120 devices and for back up. These could be compared and a whole disk hash obtained. Drive encryption keys could be generated and loaded as part of the ceremony. Tests to insure quality might be applied.

In step 650, the block of unpredictable data is loaded into the VLK module 122. It is understood that in some embodiments this need only be done one time or whenever necessary for security reasons. In step 652, if the block of unpredictable data is ever transferred out of the VLK module 122 the process could take longer than ten minutes by virtue of the size of the block and the transfer speed. As indicated below this is a security measure as described below in conjunction with the operation of the Data Guard 130 and the configuration of the VLK module 122 storage. In step 660, exfiltrating the block of unpredictable data out of the restricted secret server is deterred by the size of the block of unpredictable data stored in the VLK module 122 and the time to transfer the block of unpredictable data out of the VLK module 122. It is further understood that steps 652 and 660 are for security purposes and indicate the operation of the VLK module 122 with respect to data transfers and that these steps along with steps 640 and 650 are not generally part of password authentication/verification process.

In step 670, the salt included in the message is used as a seed for a deterministic random number generator (DRNG) on the restricted secret server. In step 680, the seeded DRNG is used to select multiple subsets of data from the block of unpredictable data. In step 690, the multiple subsets of data from the block of unpredictable data are combined to form a password authenticator token. The process description continues at step 710, FIG. 7.

Figure 7:
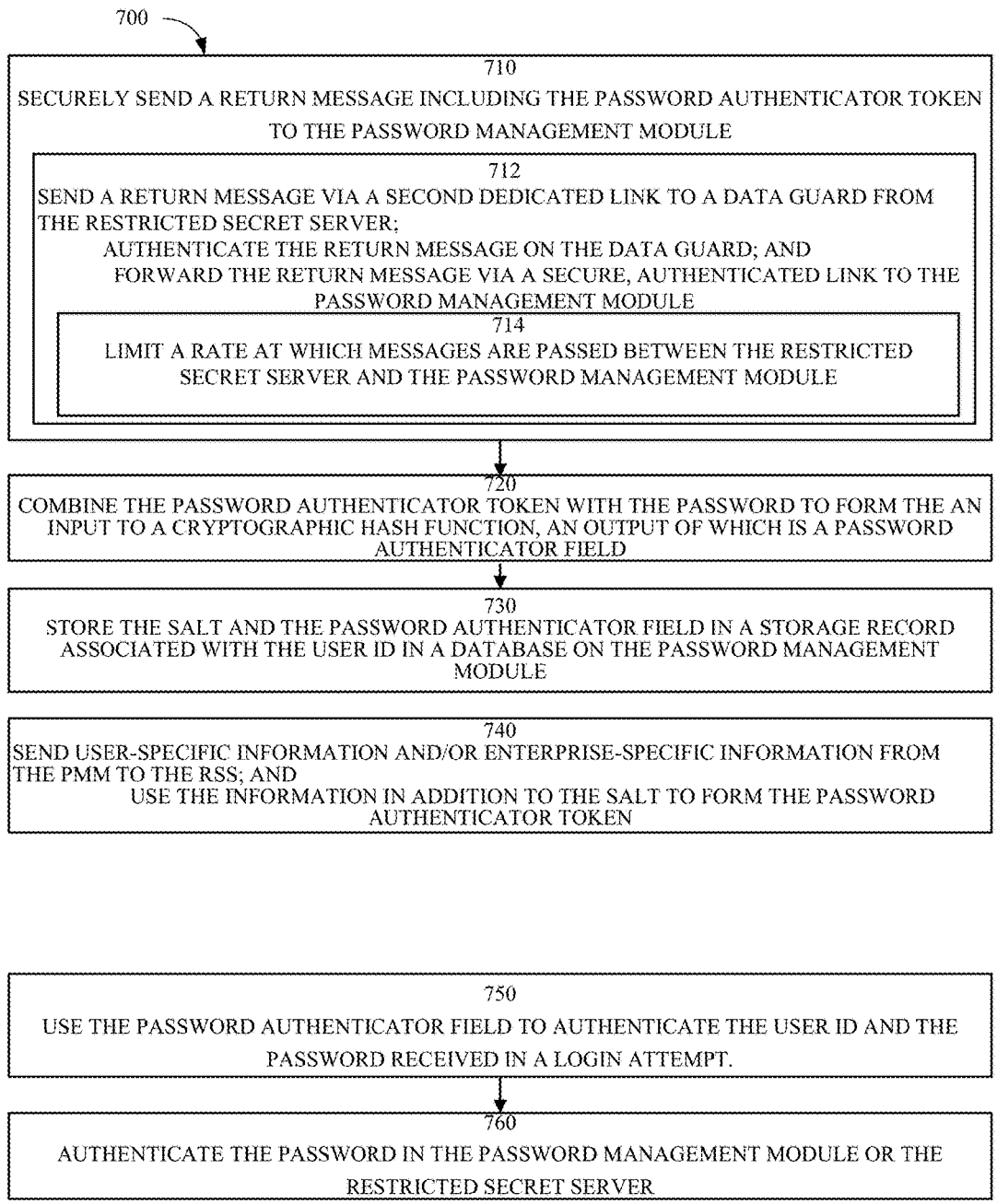
FIG. 7 is a flow chart of processing steps performed to generate a password authenticator token and authenticate a password using the password authenticator token in accordance with embodiments disclosed herein.

In FIG. 7, flowchart 700 diagrams further details of password authenticator token generation and the overall process of the password authentication. In step 710, a return message including the password authenticator token is securely sent to the password management module. In one embodiment in step 712, the return message is sent via a second dedicated link to the Data Guard 130 from the restricted secret server, authenticated on the Data Guard 130 and forwarded via the secure, authenticated link to the password management module 110. At step 714, a rate at which messages are passed between the restricted secret server and the password management module are limited.

In step 720, the password authenticator token is combined with the password to form an input to a cryptographic hash function, an output of which is a password authenticator field, and in step 730, the salt and the password authenticator field are stored in a storage record associated with the user id in a database on the password management module. Optionally in step 740, user-specific information and/or enterprise-specific information can be sent from the PMM 110 to the RSS 120 and the information can be used in addition to the salt to form the password authenticator token.

After the salt and the password authenticator field are stored in a storage record associated with the user id in a database on the password management module, the system 100 is ready to authenticate passwords. At step 750, the password authenticator field is used to authenticate the user id and the password received in a login attempt (as described above in conjunction with the password verification Pseudo code description).

To minimize programming errors that might compromise reliability of security, a modern programming language, such as Rust, Swift or Haskell might be employed. There are Haskell tools available for designing reliable embedded systems.

An operating system might not be needed in the Data Guard 130. The programs are simple enough to be self-contained.

Dynamic memory programming methods could be avoided, as every field size is fixed. Independent, isolated "clean room" programmer teams could be used to program the RSS 120 and the Data Guard 130.

As discussed above, there are at least two possible modes of operation for verification. They differ in where the final password verification comparison is performed; in Mode 1 it is performed in the PMM 110 while in Mode 2 it is performed in the RSS 120. (Other possibilities include doing the verification in the Data Guard 130 or RSS-NI 124.):

Mode 1:

In Mode 1, the PMM 110 sends a message including a message ID, and the salt value that was stored in the user's record, or alternately the user ID in lieu of salt. The RSS 120 then uses the salt and VLK to compute the password authenticator token. The return message from the RSS 120 includes the password authenticator token, which is then hashed with the password to produce the verification hash value. The verification hash value is stored in the password database for account creation or compared with the stored verification hash value for account verification.

Mode 2:

In Mode 2, for verification the PMM 110 sends a message including a message ID, the password, and the salt value and verification hash value that were stored in the user's record. The RSS 120 then uses the salt and VLK to compute the password authenticator token. The password authenticator token is then hashed with the password to produce a verification hash value which is then compared with verification hash value that was stored in the user's record. The RSS 120 returns a go/no go signal depending on whether the hashes match. For account creation, mode 2 behaves like Mode 1. Below is a pseudo code description of a conventional method of password verification for comparison purposes:

```
//An example of conventional password verification
User: Attempts to access computer resource
Password System (PS): Upon detecting a computer resource access request:
PS: (display step) Display login screen asking user for userID and password
User: Enters userID and password
PS: Attempt to retrieve user's record from password verification database indexed by
userID
PS: If there is no record indexed by userID, display login fail message then go to display
step
PS: Extract the following three data strings from the user's record: version info,
verification data, salt
PS: Calculate a hash value of the password and salt using the hash technique specified by
version
PS: If the hash value calculated in previous step does not match verification data, display
login fail message then go to display step
PS: Allow access
PS: Wait for next login attempt
// End of example of conventional password verification.
// Conventional account creation and password change operate similarly, except the salt
and the hash value calculated from the new password is stored in the user's record.
```

Below is a pseudo code description of password verification in two embodiments:

```
//An example of how password verification would be performed in mode 1
User: Attempts to access computer resource
PMM: Upon detecting a computer resource access request:
PMM: (display step) Display login screen asking user for userID and password
User: Enters userID and password
PMM: Attempt to retrieve user's record from password verification database indexed by
userID
PMM: If there is no record indexed by userID, display login fail message then go to
display step
PMM: Extract the following three data strings from the user's record: version info,
verification data, salt
PMM: Verify that current version is in use for this user, if not use previous verification
method
PMM: Send encrypted message comprising message number, salt and message checksum
to RSS-NI
PMM: Wait a certain time for reply
PMM: If no reply in time allowed, resend message to PMM
RSS-NI: Upon receipt of message from a PMM do the following:
RSS-NI: Decrypt message
RSS-NI: Verify message format and checksum, if invalid, ignore message and wait for
next message
RSS-NI: Send message to Data Guard
RSS-NI: Wait for next message
Data Guard: Upon receipt of message from RSS-NI do the following:
Data Guard : Verify message format and checksum, if invalid, ignore message and wait
for next message
Data Guard : Send message to RSS
RSS: Upon receipt of message from Data Guard do the following:
RSS: Seed pseudo random number generator (PRNG) with salt
RSS: Use PRNG to select a string of bytes from the VLK
RSS: Calculate a hash of the selected string of bytes from the VLK
```

```
RSS: Send calculated hash value to PMM via Data Guard
Data Guard : Upon receipt of message from RSS do the following:
Data Guard : Verify message format and checksum, if invalid, ignore message and wait
for next message
Data Guard : Hash RSS hash value with secret key embedded in Data Guard
Data Guard : Form message comprising message Id, hash value, checksum
Data Guard : Send message to RSS-NI
RSS-NI: Upon receipt of message from RSS do the following:
RSS-NI: Verify message format and checksum, if invalid, ignore message and wait for
next message
RSS-NI: Encrypt message
RSS-NI: Send encrypted message to PMM
RSS-NI: Wait for next message
PMM: Upon receipt of message from RSS-NI do the following
PMM: Decrypt message
PMM: Calculate a hash value of the password and the hash value received from the Data
Guard
PMM: If the hash value calculated in previous step does not match verification data
retrieved from database, display login fail message then go to display step
PMM: Allow access
PMM: Wait for next login attempt
// End of mode 1 example
//Changes to above example to show how password verification would be performed
using the present invention in mode 2
For mode 2, the step
    PMM: Send encrypted message comprising message number, salt and message
checksum to RSS-N
is replaced with:
    PMM: Send encrypted message comprising message number, password, salt,
verification data and message checksum to RSS-NI
The step
    RSS: Send calculated hash value to PMM via Data Guard
is replaced with:
    RSS: Calculate a hash value of the password and the calculated hash value
    RSS: If the hash value calculated in previous step matches verification data, return
message is "verified", else return message is "failed"
    RSS: Sent return message to PMM via Data Guard
The steps
    PMM: Calculate a hash value of the password and the hash value received from the
Data Guard
    PMM: If the hash value calculated in previous step does not match verification data,
display login fail message then go to display step
are replaced with:
    PMM: If the status message is "failed", display login fail message then go to display
step
// End of mode 2 example
```

Details of the message from PMM and return message follow:

```
Verification messages:
Mode 1 inbound to RSS
Type, messageID, saltFromDatabase
Mode 2 inbound to RSS
Type, messageID, submitted Password, saltFromDatabase,
verificationHashFromDatabase
Both modes, maintenance messages inbound to RSS:
Type, timeSyncHack
Type, requestStatus
```

Return verification messages:

```
Mode 1 outbound from RSS
Type, messageID, computedPasswordAuthenticatorToken
Mode 2 outbound from RSS
Type, messageID, go/no-goBoolean
Both modes maintenance messages outbound from RSS:
When diagnostic switch normal:
Type, statusOK-notOKBoolean
When diagnostic switch permissive:
Type, detailed status and statistics
```

Other features of system 100 are described below:

VLK module 122 backup:

The VLK module 122 does not have to be backed up on a periodic basis as its content stays fixed indefinitely. Initially several copies would normally be made, some to allow two or more restricted secret servers to operate independently to assure system availability, a couple more might be installed in a disaster recovery installation, and one or two would be kept in a vault in case all active copies fail for some reason. In case a VLK storage module 122 fails, a replacement would be loaded from one of the other copies, preferably in a witnessed ceremony.

Transition plan:

A straightforward approach for implementing system 100 is to update user key records when the first login occurs after the transition start date. The password submitted would be validated using the old data and a new restricted secret record would then be generated. However this leaves the older, less secure password records on line and open to attack for a long time.

Super-encryption

A more secure approach is to super encrypt existing password records by replacing the current validation hash value by a hash (rehash) of that value using the present invention. This super-encryption would be noted in the version field of the password record. For subsequent validations, there would be a two-step process, first applying the original hash and then the restricted secret hash. When users log in the first time after the super encryption procedure, their password would be validated using the dual hash and then a normal restricted secret hash would be entered into their password record.

VLK module 122 replacement if needed:

If needed, say because of a compromise, the old VLK module 122 could be replaced by a new one using the same super encryption procedure described above. Both VLKs module 122 would have to be kept online, or the old restricted secret hash would have to be stored as a new field to the password record.

Fall back plan:

One obstacle to adoption of the present invention by organizations is the fact that the function it performs, password validation, is critical to an organization's operations. An organization might wish to implement a separate multi-factor authentication system for employees responsible for maintaining the organization's computer systems, perhaps using hardware one-time password generators, and, perhaps requiring valid entries from two employee's one-time password generators to gain access without a valid password.

As a fallback, the old password database could be stored off line. As new accounts are created, the old password hash could be computed and encrypted using a public key. The corresponding private key would be kept off-line in a hardware security module (HSM) or secure container for emergency use. Note that to prevent guessing attacks on the encrypted password hash, a random nonce could be interspersed with the hash value and a block cipher such as AES employed. For example, password hash bytes and random data could alternate. There would be no need to save the random data, unlike for salt.

In case of complete failure of the password verification system or it proves unsatisfactory to a customer for some other reason, the old password database could be reloaded and the private key used to encrypt newer passwords would be introduced to allow the newer password to be decrypted.

Reliability:

Reliability is an issue, as organizations that adopt the present invention will be dependent on it. There are a wide variety of ways of configuring the present invention. Here is one possible approach:

Two systems per safe:

Each safe might include at least two restricted secret servers, each with their own VLK module 122. Having two or more would increase both reliability and throughput. Separate powers supplies would also be included. They would be completely independent, except possibly for a communication link for error recovery. If non-recoverable ECC errors are detected in one server, it could get correct information from the other server. Whether this feature is worth losing complete independence between servers is an engineering tradeoff to be determined.

Two or more safes per organization:

An organization might have more than one restricted secret safes per data center, perhaps located in physically separate locations. If the organization maintains an offsite disaster recovery installation, a restricted secret safe could be located there as well. Organizations with more than one data center could share restricted secret servers between data centers if need be, perhaps using encrypted links. If necessary an additional layer of error correcting codes can be used in the RSS 120.

VLK module 122 degrades gracefully. Most read errors will be detected and corrected by the ECC in the SSD memory controller. Errors that still cannot be corrected only affect a small number of passwords. If necessary, the RSS 120 can signal an unrecoverable error to the PMM 110. If the unrecoverable error occurs during password creation, a different salt value can be selected and there is little likelihood the error will repeat since other parts of the VLK module 122 will be accessed. If the unrecoverable error occurs during password validation, the user can be asked security questions and if successful, a new password record with a different salt created. Alternatively, the verification could be tried on a different VLK module 122 if there are more than one online. It should not be possible for an attacker to know about such errors and take advantage of the situation. In any case we expect such situations to be extremely rare, so this additional layer of complexity might not be justified.

Diagnostic info:

Getting health and status information out of the restricted secret server could create a security vulnerability. The diagnostic data could be used by infected RSS 120 software to leak information about the content of the VLK module 122. One mitigation approach might be for the Data Guard 130 to relay all diagnostic information while enforcing a limit on the diagnostic data rate. In normal operation, diagnostic information would be tightly constrained in size and frequency to prevent it being used to leak a significant amount of the VLK. Only a single "health ok" light might be provided, perhaps using an incandescent lamp to limit the rate at which it could be used to leak data. Another option might be a mechanical flag operated by a solenoid inside the enclosure. Extended diagnostics might be transmitted infrequently, perhaps once an hour or once a shift, and might include:

Hourly message count;
ECC errors counts;
Password validation request log;
Honeypot hits;
Internal error message log;
Internal temperatures; and
Fan status (preferably the thermal design will not require internal fans)

Another, complementary measure might be a placing key lock or two on the restricted secret server enclosure that would have to be turned to get more complete diagnostic information. The switches could also be wired to the security alarm system. The second switch, keyed differently, could be used to maintain two person integrity. One switch might be located at the front of the unit and the second on the back. If the RSS 120 is rack mounted in the common data center configuration, this would require one person in the front isle and a second person in the back isle to actuate the extended diagnostics.

Potential attacks and possible physical security measures are listed below:

Insider attacks:

To prevent malware from asking for and recording password authenticator tokens one might keep count of requests in the RSS 120 or Data Guard 130 and transmit the count periodically to detect unusual request patterns.

One might add canary or honey-pot password hash values or salts to the password verification database that are also known to the RSS 120 or Data Guard 130. Since these do not correspond to any real user an alarm could be triggered if a request using that hash or salt value is received in the RSS 120 or Data Guard 130, as this might indicate that malware is systematically probing the password verification database.

Exceptionally easy to guess passwords, such as the name of a user's pet, may still be vulnerable. All password systems are vulnerable to this attack. Offering two word plus symbol passwords, or requiring a minimum password length, or requiring a number or special character can mitigate the vulnerability.

Installations can, and still should, employ measures to protect the password database and other user specific data from attack.

Additional potential physical security measures include:

Packaging the Data Guard 130 in potting material or other tamper proof materials;

Using non-standard connectors on the VLK module 122 and Data Guard 130; and

If more than one VLK module 122 is used in an RSS 120, including a physical interlock to insure that only one module can be extracted at a time.

Parameter analysis:

One goal of using a large VLK is to make the present invention resilient to small leaks of key material. For block structured devices, such as SSD, one important parameter is the number, BPW, of pages of VLK accessed per password. If the VLK module 122 can be assumed to be secure, there is no need for more than one page per password. The following logic argues for more than one page per password:

The VLK module 122 can be made large enough so that a person gaining physical access to the inside of the secure container including the VLK module 122 would need a significant amount of time to copy the entire key. They would be limited by the transfer rate of the SSD module. For example, the specifications for a SAMSUNG 850 EVO 1 TB SDD, solid state drive, state a maximum read data transfer rate of 540 MB/s. At that rate, transferring 1 TB would require 1852 seconds or about 31 minutes. With reasonable physical security in a data center guarded 24 hours a day, it should be possible to deny an unauthorized person that much access to the equipment. By proper choice of parameters it is possible to limit the damage resulting even if a person is able to gain access to a smaller portion of the data.

Suppose an attacker obtains a fraction, h, of the VLK. A one terabyte VLK, organized into 4 KB pages has NB=250,000 pages. Assuming the number of user accounts USRS>>NB. If the number of blocks per password, BPW=1, i.e. each password authenticator token is depended to the content of a single page, there is a high likelihood that some passwords will be compromised if even a single block is leaked.

Assume that a minimum number of bytes, say 16, are pseudo-randomly selected from each page so that an attacker cannot feasibly guess the missing bytes from that page. Since the entire contents of an accessed page are in RAM, this is inexpensive computationally. If h=fraction of VLK compromised then the probability that a single password is compromised is $h^{BPW}$. Since the maximum SSD transfer rate is for sequential reads, additional protection might be accomplished by selecting pages that are a minimum distance from each other, perhaps by breaking the VLK into sections and insuring a page is selected from each section. If the VLK spans several SSD device, it is useful to insure at least one page is selected from each device. Then copying even one entire device would not compromise the system.

The size of the password authenticator token is also a trade off. If an attacker does not know the password authenticator token for a particular stored hash, he or she must try all possible password authenticator tokens for each possible guess. With a short token length, say 16 bits, trying all combinations might be feasible. If the password authenticator token is too long, a malicious implant inserted into the RSS 120 might somehow be able to use the output stream to leak too much of the contents of the RSS 120. In one embodiment, reasonable compromise token length might be 128 bits.

Performance factors include:
Size of VLK;
Page size;
Maximum VLK read transfer rate;
Minutes to copy complete VLK;
Minutes of possible undetected access;
Number of password records;
Communications latency; and
Hash timing.

The RSS 120 could batch several incoming requests during peak times to take advantage of the higher random read performance of SSD drives when requests are queued. For example, the Samsung 850 SSD offers 10,000 random reads per second with a queue depth of one, but 100,000 per second with a cue depth of 32.

Throughout the entirety of the present disclosure, use of the articles "a" or "an" to modify a noun may be understood to be used for convenience and to include one, or more than one of the modified noun, unless otherwise specifically stated.

While configurations of the system and method have been particularly shown and described with references to configurations thereof, it will be understood by those skilled in the art that various changes in form and details may be made therein without departing from the scope of the invention. As an example, the order of processing steps in the flow charts is not limited to the order shown herein. Accordingly, the present invention is not limited by the example configurations provided above Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein. Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method for password authentication comprising:
obtaining a user id and a password as input on a password management module (PMM) comprising software executing on a processor configured to communicate with a restricted secret server (RSS);
generating a salt on the password management module;
securely sending a message including the salt to the RSS having a very large key (VLK) module using one of:
   a direct communication link between the PMM and RSS; and
   a secure link within an intranet;
generating a block of unpredictable data by a cryptographically-strong bit stream generator;
loading the block of unpredictable data into the VLK module;

using the salt included in the message as a seed for a deterministic random number generator (DRNG) on the restricted secret server;

using the seeded DRNG to select multiple subsets of data from the block of unpredictable data;

combining the multiple subsets of data from the block of unpredictable data to form a password authenticator token;

securely sending a return message including the password authenticator token to the password management module;

combining the password authenticator token with the password to form an input to a cryptographic hash function, an output of which is a password authenticator field; and storing the salt and the password authenticator field in a storage record associated with the user id in a database on the password management module;

wherein the VLK module comprises a data memory storage device which is removable from the restricted secret server; and providing a secure interlock between the VLK module and the restricted secret server.

2. The method for password authentication of claim 1 further comprising:
sending information including at least one of:
user-specific information; and
enterprise-specific information, from the PMM to the RSS; and
using the information in addition to the salt to form the password authenticator token.

3. The method for password authentication of claim 1, further comprising using the password authenticator field to authenticate the user id and the password received in a login attempt.

4. The method for password authentication of claim 3 further comprising authenticating the password in one of:
the password management module; and
the restricted secret server.

5. The method for password authentication of claim 1, wherein securely sending a message to the restricted secret server comprises:
sending the message via a secure, authenticated link to a data guard;
authenticating the message on the data guard; and
forwarding the message via a dedicated link to the restricted secret server.

6. The method for password authentication of claim 5, wherein securely sending a return message to the password management module comprises:
sending the return message via a second dedicated link to a data guard from the restricted secret server;
authenticating the return message on the data guard; and
forwarding the return message via a secure, authenticated link to the password management module.

7. The method for password authentication of claim 6 further comprising:
limiting a rate at which messages are passed between the restricted secret server and the password management module by insertion of the data guard in the communications path.

8. The method for password authentication of claim 1, wherein the VLK module is removable from the restricted secret server.

9. The method for password authentication of claim 8, wherein the removable VLK module is in a sealed unit designed to plug only into a corresponding restricted secret server.

10. The method for password authentication of claim 9, wherein the sealed unit uses non-standard connector pin-outs.

11. The method for password authentication of claim 9, wherein the sealed unit uses a body that mechanically interlocks with a restricted secret server housing.

12. The method for password authentication of claim 9, wherein the sealed unit uses non-standard connector pin-outs and mechanical interlocks that are custom designed for each customer installation.

13. The method for password authentication of claim 1 further comprising sending the message and return message between the password management module and the restricted secret server, the message and return message fixed in size to prevent buffer overflow attacks.

14. The method for password authentication of claim 1, wherein the block of unpredictable data stored in the VLK module has a size such that a time to transfer the block of unpredictable data deters exfiltrating the block of unpredictable data out of the restricted secret server; wherein transferring the block of unpredictable data takes longer than ten minutes which deters exfiltrating the block of unpredictable data out of the restricted secret server.

15. The method for password authentication of claim 1, further comprising creating a no-lone-zone perimeter around the RSS.

16. A system for password authentication comprising:
a password management module (PMM);
a restricted secret server (RSS) interconnected to the PMM and having:
at least one very large key (VLK) storage module;
a Data Guard coupled to the at least one VLK storage module;
a restricted secret server network interface (RSS-NI) coupled to the Data Guard and interconnecting the RSS with the PMM;
wherein the Data Guard is disposed between the RSS-NI and the at least one VLK storage module and is configured to restrict and sanitize data by enforcing message formats and restricting the transfer rate of VLK data;
wherein the interconnection between the PMM and RSS comprises one of:
a direct communication link; and
a secure link within an intranet;
wherein the VLK storage module is removable from the restricted secret server and further comprising a secure interlock between the VLK module and the restricted secret server;
wherein the PMM includes a processor and exchanges messages with the RSS; and
wherein a VLK and the VLK storage module which stores the VLK are of a size such that a time to transfer a block of unpredictable data out of the restricted secret server is longer than ten minutes so as to deter unauthorized transfer of the VLK out of the RSS.

17. The system of claim 16, wherein the VLK storage module further comprises a VLK storage module alarm which is triggered when the VLK storage module is removed from the RSS.

18. The system of claim 17, wherein the VLK storage module alarm comprises an optical sensor.

19. The system of claim 16, wherein the VLK storage module comprises a plurality of grooves and flutes to prevent insertion of an unauthorized VLK storage module into the RSS.

20. The system of claim 16, wherein the VLK storage module include storage which comprises one of:
- a solid state drive (SSD);
- a rotating hard disk; and
- a NOR flash memory.

21. The system of claim 16, wherein the VLK storage module comprises storage which comprises a memory device having non-standard firmware such that said memory device's control commands in the non-standard firmware differ from standard control commands of a corresponding standard memory device by including tamper detection and an automatic erase operation of the VLK in the VLK storage module after receiving a tamper detection indication.

22. The system of claim 16, wherein the RSS further comprises an interface to a no-lone-zone perimeter alarm system.

* * * * *